(12) United States Patent
Lee et al.

(10) Patent No.: US 11,848,161 B2
(45) Date of Patent: Dec. 19, 2023

(54) MULTILAYER CERAMIC CAPACITOR AND BOARD HAVING THE SAME

(71) Applicant: SAMSUNG ELECTRO-MECHANICS CO., LTD., Suwon-si (KR)

(72) Inventors: Joon Woon Lee, Suwon-si (KR); Je Ik Moon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 131 days.

(21) Appl. No.: 17/493,343

(22) Filed: Oct. 4, 2021

(65) Prior Publication Data
US 2022/0208470 A1 Jun. 30, 2022

(30) Foreign Application Priority Data
Dec. 28, 2020 (KR) .................. 10-2020-0184166

(51) Int. Cl.
*H01G 4/30* (2006.01)
*H01G 4/012* (2006.01)
*H01G 4/12* (2006.01)
*H01G 2/06* (2006.01)
*H01G 4/008* (2006.01)

(52) U.S. Cl.
CPC .............. *H01G 4/30* (2013.01); *H01G 2/065* (2013.01); *H01G 4/008* (2013.01); *H01G 4/012* (2013.01); *H01G 4/12* (2013.01)

(58) Field of Classification Search
CPC .......... H01G 4/30; H01G 4/065; H01G 4/012; H01G 4/12; H01G 4/1227; H01G 4/2325; H01G 4/1209; H01G 4/228; H01G 4/306; H01G 2/02; H01G 4/008; H01G 4/1218
See application file for complete search history.

(56) References Cited

U.S. PATENT DOCUMENTS

| | | | |
|---|---|---|---|
| 2001/0019176 A1* | 9/2001 | Ahiko | H01G 4/232 257/772 |
| 2003/0026064 A1* | 2/2003 | Nakada | H01G 9/15 361/523 |
| 2010/0079925 A1 | 4/2010 | Togashi et al. | |

(Continued)

FOREIGN PATENT DOCUMENTS

| | | |
|---|---|---|
| KR | 10-2010-0036982 A | 4/2010 |
| KR | 10-2013-0056569 A | 5/2013 |

*Primary Examiner* — Michael P McFadden
(74) *Attorney, Agent, or Firm* — MORGAN, LEWIS & BOCKIUS LLP

(57) ABSTRACT

Provided are a multilayer ceramic capacitor and a board having the same, the multilayer ceramic capacitor including: a capacitor body including an active region, which includes a plurality of dielectric layers and a plurality of internal electrodes alternately disposed with respective dielectric layers interposed therebetween, and covers formed on and under the active region, respectively. The multilayer ceramic capacitor further includes external electrodes disposed on the capacitor body so as to be connected to the internal electrodes. Among the internal electrodes, an internal electrode disposed adjacently to one of the covers has at least one cutaway portion within a portion of the internal electrode connected to the external electrode, and the cutaway portion is (at least partially) filled with a dielectric material.

18 Claims, 6 Drawing Sheets

(56) References Cited

U.S. PATENT DOCUMENTS

| | | | |
|---|---|---|---|
| 2014/0285946 A1* | 9/2014 | Yoon | H01G 4/0085 29/25.03 |
| 2018/0019064 A1* | 1/2018 | Han | H01G 4/008 |
| 2021/0074484 A1* | 3/2021 | Furukawa | H01G 9/08 |

* cited by examiner

MULTILAYER CERAMIC CAPACITOR AND BOARD HAVING THE SAME

CROSS-REFERENCE TO RELATED APPLICATION(S)

This application claims the benefit of priority to Korean Patent Application No. 10-2020-0184166 filed on Dec. 28, 2020 in the Korean Intellectual Property Office, the disclosure of which is incorporated herein by reference in its entirety.

TECHNICAL FIELD

The present disclosure relates to a multilayer ceramic capacitor and a board having the same.

BACKGROUND

A multilayer ceramic capacitor (MLCC) is a passive element and serves to control an electric signal in a circuit.

Such a multilayer ceramic capacitor is formed by stacking a plurality of dielectric layers and internal electrodes. In a MLCC, a major defect such as a crack may occur between an active region including the internal electrodes and a cover.

Such a crack is caused for various reasons. One of the biggest reasons is delamination occurring as the cover and the internal electrode are parted or separated from each other when a laminate is cut, due to decreased bonding strength between the cover and the internal electrode.

The delamination becomes severe during sintering, and thus becomes a major cause of the crack occurring between the active region and the cover.

SUMMARY

An aspect of the present disclosure may provide a multilayer ceramic capacitor in which occurrence of a crack between an active region and a cover may be suppressed, and a board having the same.

According to an aspect of the present disclosure, a multilayer ceramic capacitor may include: a capacitor body including an active region including a plurality of dielectric layers and a plurality of internal electrodes alternately disposed with respective dielectric layers interposed therebetween, and covers disposed on and under the active region, respectively; and external electrodes disposed on the capacitor body so as to be connected to the internal electrodes, wherein among the internal electrodes, an internal electrode disposed adjacently to one of the covers has a cutaway portion within a portion of the internal electrode connected to the external electrode and the cutaway portion is filled with a dielectric material.

The cutaway portion may be formed in two internal electrodes disposed adjacently to the cover.

The cutaway portion may be filled with a portion of one of the plurality of dielectric layers.

The cutaway portion may have a semicircular shape.

The internal electrode disposed adjacently to the cover may further have at least one hole formed in a portion adjacent to the cutaway portion.

The hole may have a circular shape.

A total area of the cutaway portion and the hole may be 50% or less of B×C, B being a width of the internal electrode disposed adjacently to the cover, and C being $\frac{1}{10}$ or less of a length of the internal electrode.

The cutaway portion may be filled with a portion of one of the plurality of dielectric layers, and the internal electrode disposed adjacently to the cover may further have at least one hole formed in a portion adjacent to the cutaway portion.

The external electrode may include a connected portion formed at one end surface of the capacitor body, and a band portion extending from the connected portion to a portion of a circumferential surface of the capacitor body.

According to another aspect of the present disclosure, a board having a multilayer ceramic capacitor may include: a board having one surface on which a plurality of electrode pads are disposed; and the above-described multilayer ceramic capacitor mounted so that the external electrodes are connected to the electrode pads, respectively.

According to yet another aspect of the present disclosure, a multilayer ceramic capacitor includes a capacitor body including a plurality of dielectric layers and a plurality of internal electrodes disposed with respective dielectric layers interposed therebetween, and a cover disposed on or under a first internal electrode of the plurality of internal electrodes such that the cover is adjacent to the first internal electrode. The first internal electrode includes a cutaway portion within a part of the first internal electrode that is to be connected to an external electrode and the cutaway portion is at least partially filled with a dielectric material.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
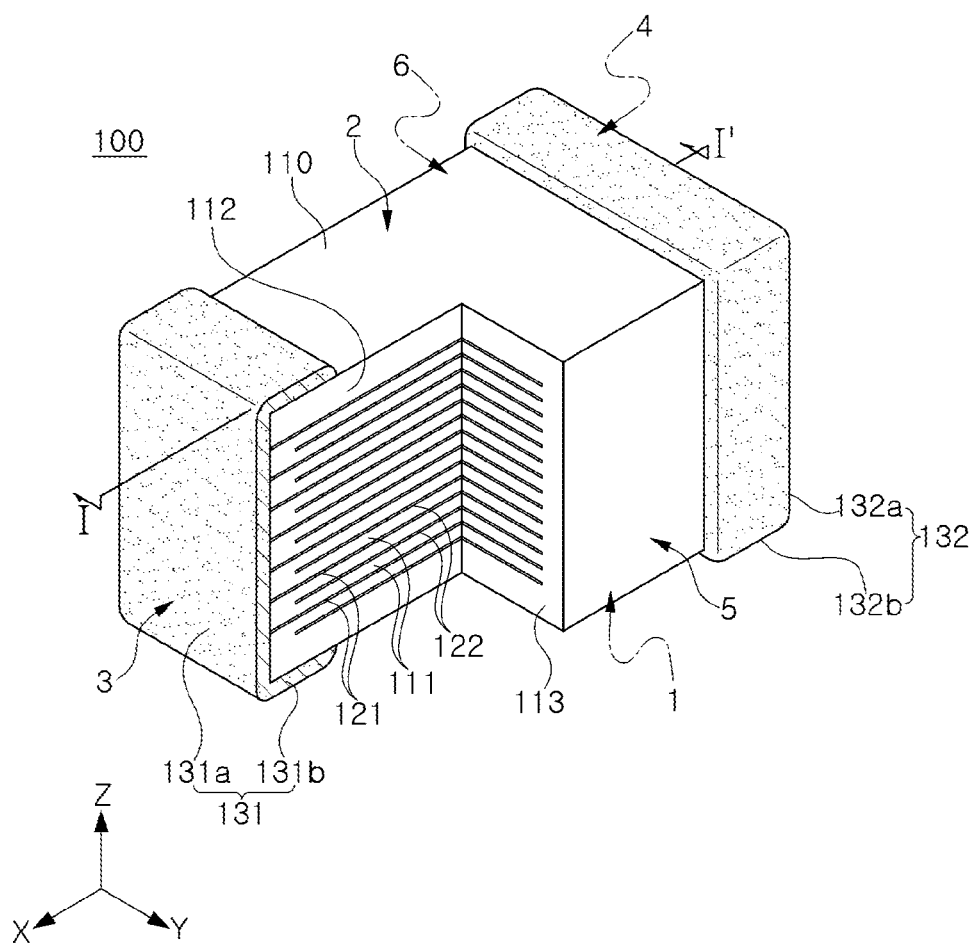
FIG. 1 is a schematic partially cut-away perspective view of a multilayer ceramic capacitor according to an exemplary embodiment in the present disclosure.

Hereinafter, exemplary embodiments in the present disclosure will now be described in detail with reference to the accompanying drawings.

Directions of a capacitor body will be defined in order to clearly describe exemplary embodiments in the present disclosure. X, Y and Z in the drawings refer to a length direction, a width direction, and a thickness direction of the capacitor body, respectively.

In addition, in the present exemplary embodiment, the Z direction refers to a stacked direction in which dielectric layers are stacked.

Throughout the specification, when a component is referred to as "comprise" or "comprising," it means that it may include other components as well, rather than excluding other components, unless specifically stated otherwise.

In the present specification, expressions such as "having", "may have", "comprises", or "may contain" may include a presence of a corresponding feature (e.g., components such as numerical, functions, operations, components, or the like), and a presence of additional feature does not be excluded.

In this specification, that a member is disposed "on" a certain component includes not only the case where the member is disposed in direct contact with the component, but also the case where another component is disposed between the component and the member.

In the present specification, expressions such as "A or B", "at least one of A or/and B", "one or more of A or/and B", or the like may include all possible combinations items listed together. For example, "A or B", "at least one of A and B", or "at least one of A or B" may refer to include cases of (1) at least one A, (2) at least one B, or (3) both including at least one A and at least one B.

A multilayer ceramic capacitor according to the present disclosure includes: a capacitor body including an active region including a plurality of dielectric layers and a plurality of internal electrodes alternately disposed with respective dielectric layers interposed therebetween, and covers formed on and under the active region, respectively; and external electrodes disposed on the capacitor body so as to be connected to the internal electrodes, in which among the internal electrodes, an internal electrode disposed between the active region and the cover has at least one cutaway portion formed in a portion connected to the external electrode.

Figure 2A:
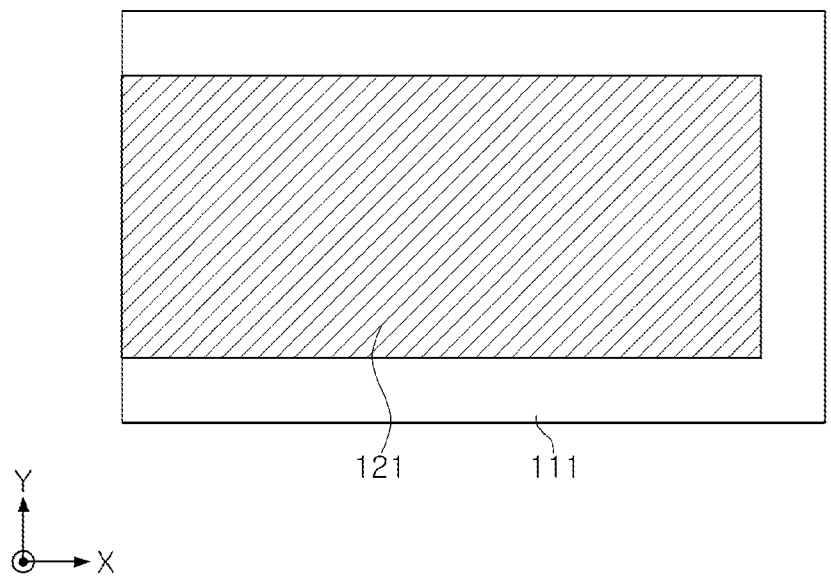
FIGS. 2A and 2B are plan views illustrating, respectively, first and second internal electrodes of FIG. 1.
Figure 2B:
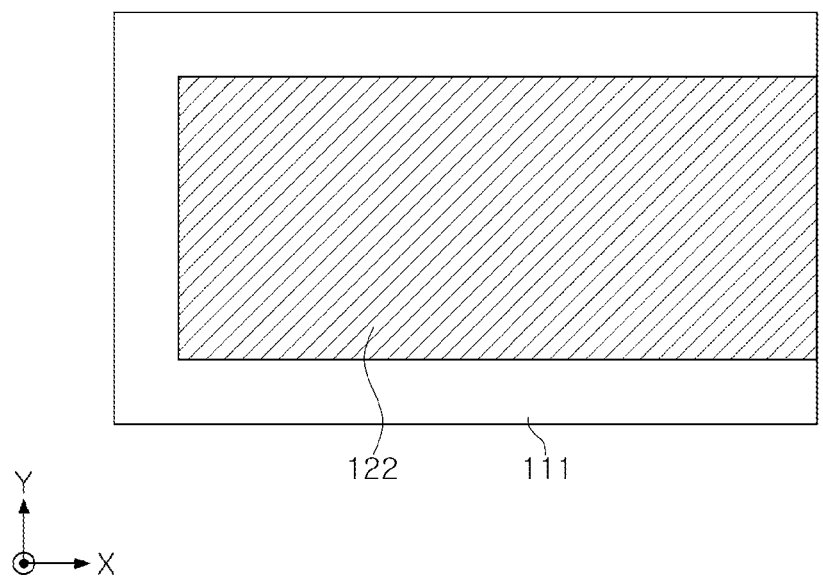
Figure 3A:
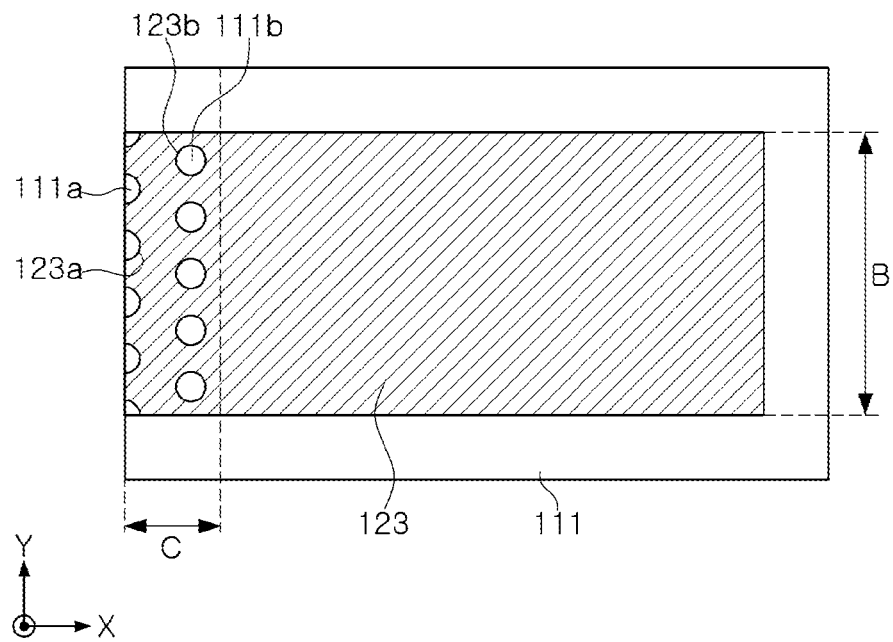
FIGS. 3A and 3B are plan views illustrating, respectively, third and fourth internal electrodes of FIG. 1.
Figure 3B:
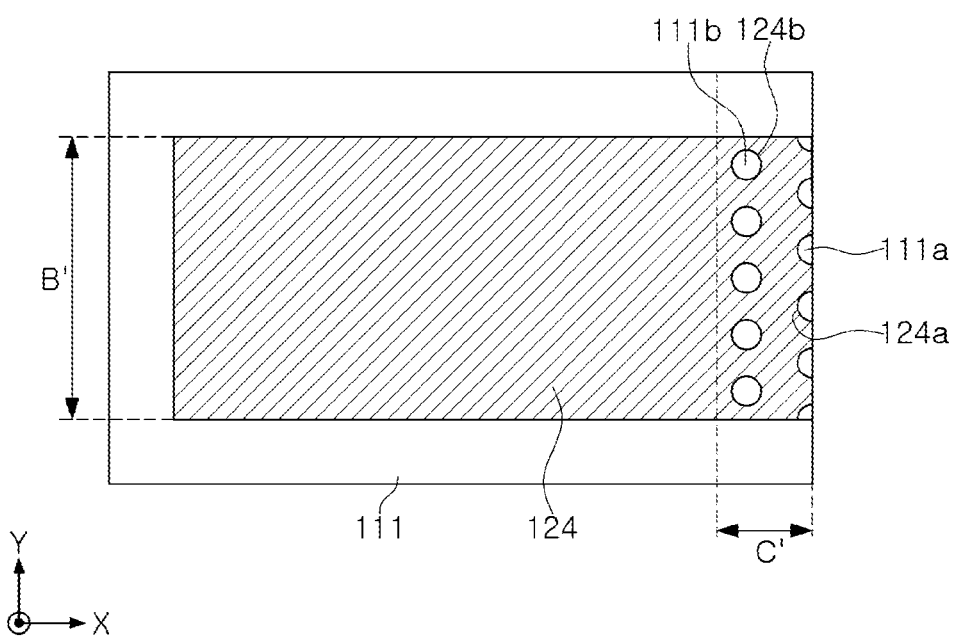
Figure 4:
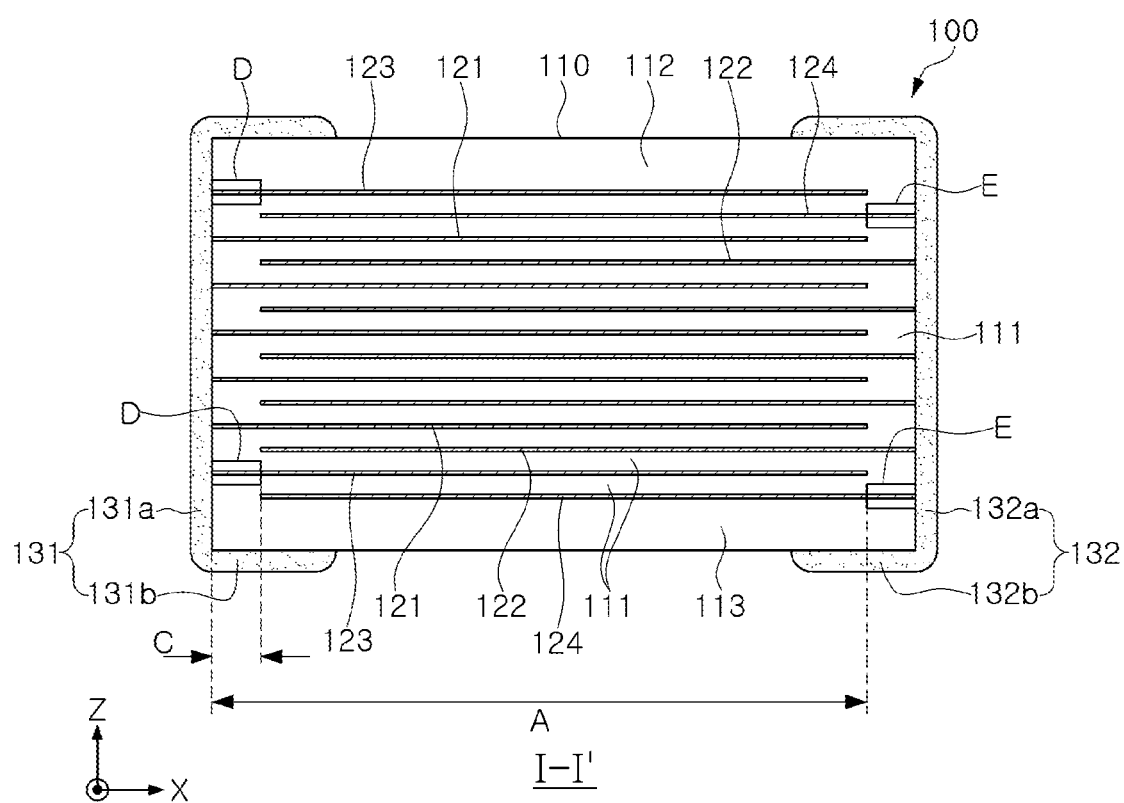
FIG. 4 is a cross-sectional view taken along line I-I' of FIG. 1.
Figure 5:
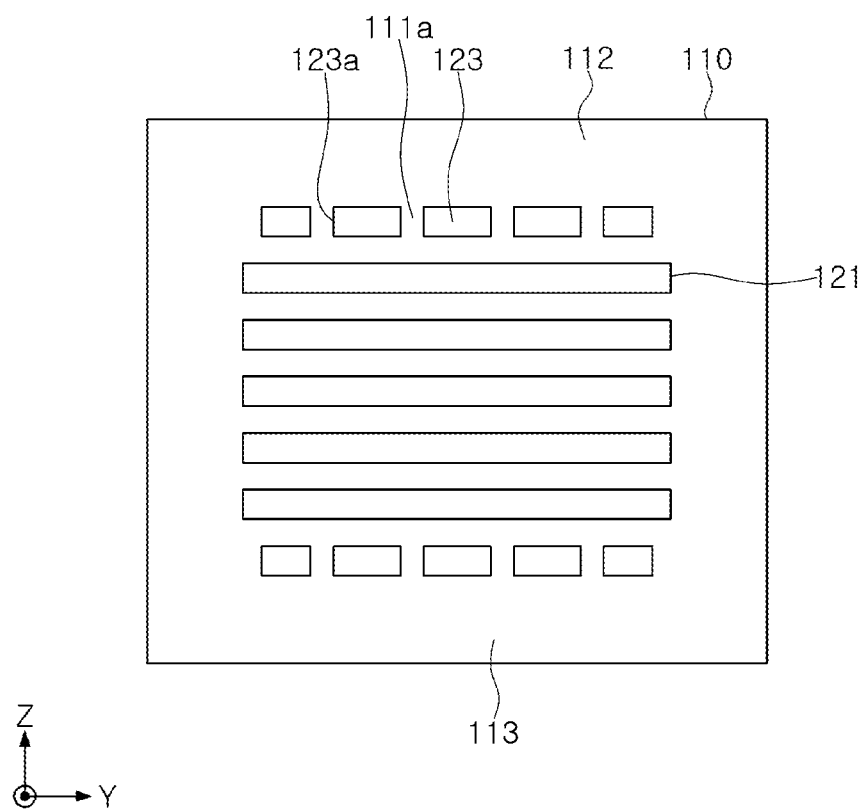
FIG. 5 illustrates a third surface of a capacitor body.

FIG. 1 is a schematic partially cut-away perspective view of a multilayer ceramic capacitor according to an exemplary embodiment in the present disclosure, FIGS. 2A and 2B are plan views illustrating, respectively, first and second internal electrodes of FIG. 1, FIGS. 3A and 3B are plan views illustrating, respectively, third and fourth internal electrodes of FIG. 1, FIG. 4 is a cross-sectional view taken along line I-I' of FIG. 1, and FIG. 5 illustrates a third surface of a capacitor body.

Referring to FIGS. 1 through 5, a multilayer ceramic capacitor 100 according to the present exemplary embodiment may include a capacitor body 110 and first and second external electrodes 131 and 132.

The capacitor body 110 may include a plurality of dielectric layers 111 and a plurality of first and second internal electrodes 121 and 122 alternately disposed in the Z direction with respective dielectric layers 111 interposed therebetween.

The capacitor body 110 may be formed by stacking and then sintering the plurality of dielectric layers 111 in the Z direction, and adjacent dielectric layers 111 of the capacitor body 110 may be integrated with each other so that boundaries therebetween are not readily apparent without using a scanning electron microscope (SEM).

Here, the capacitor body 110 may have a substantially hexahedral shape. However, the shape of the capacitor body 110 is not limited thereto. Further, the shape and dimension of the capacitor body 110 and the number of stacked dielectric layers 111 are not limited to those illustrated in the drawings.

In the present exemplary embodiment, for convenience of explanation, first and second surfaces 1 and 2 of the capacitor body 110 refer to opposite surfaces of the capacitor body 110 opposing each other in the Z direction, third and fourth surfaces 3 and 4 of the capacitor body 110 refer to opposite surfaces of the capacitor body 110 connected to the first and second surfaces 1 and 2 and opposing each other in the X direction, and fifth and sixth surfaces 5 and 6 of the capacitor body 110 refer to opposite surfaces of the capacitor body 110 connected to the first and second surfaces 1 and 2, connected to the third and fourth surfaces 3 and 4, and opposing each other in the Y direction.

Further, in the present exemplary embodiment, amounted surface of the multilayer ceramic capacitor 100 may be the first surface 1 of the capacity body 110.

The dielectric layer 111 may include a ceramic material having a high dielectric constant, such as barium titanate ($BaTiO_3$)-based ceramic powder or strontium titanate ($SrTiO_3$)-based ceramic powder. However, the material of the dielectric layer 111 is not limited thereto as long as a sufficient capacitance may be obtained.

In addition, the dielectric layer 111 may further include a ceramic additive, an organic solvent, a plasticizer, a binder, a dispersant, and the like, in addition to the ceramic powder.

Examples of the ceramic additive may include a transition metal oxide or a transition metal carbide, a rare earth element, magnesium (Mg), and aluminum (Al).

The capacitor body 110 may include an active region, which contributes to forming a capacitance of the capacitor, and upper and lower covers 112 and 113 formed as upper and lower margin portions on upper and lower surfaces of the active region in the Z direction, respectively.

The upper and lower covers 112 and 113 may be formed of the same material as that of the dielectric layer 111 and have the same configuration as that of the dielectric layers 111 except that they do not include the internal electrodes.

The upper and lower covers 112 and 113 may be formed by stacking a single dielectric layer or two or more dielectric layers on the upper and lower surfaces of the active region, respectively, in the Z direction, and may basically serve to prevent damage to the first and second internal electrodes 121 and 122 due to physical or chemical stress.

Here, a pair of internal electrodes disposed between the upper surface of the active region and the upper cover 112 and a pair of internal electrodes disposed between the lower surface of the active region and the lower cover 113 are defined as third and fourth internal electrodes 123 and 124. The third and fourth internal electrodes 123 and 124 will be described in detail later.

The first and second internal electrodes 121 and 122, which are electrodes to which different polarities are applied, may be alternately disposed in the Z direction with respective dielectric layers 111 interposed therebetween, and one ends of the first and second internal electrodes 121 and 122 may be exposed through the third and fourth surfaces 3 and 4 of the capacitor body 110, respectively.

In this case, the first and second internal electrodes 121 and 122 may be electrically insulated from each other by respective dielectric layers 111 disposed therebetween.

The end portions of the first and second internal electrodes 121 and 122 alternately exposed through the third and fourth surfaces 3 and 4 of the capacitor body 110, respectively, may be electrically connected to the first and second external electrodes 131 and 132 disposed on the third and fourth surfaces 3 and 4 of the capacitor body 110 to be described below, respectively.

Further, the third and fourth internal electrodes 123 and 124 according to the present exemplary embodiment are electrodes to which different polarities are applied, and one ends of the third and fourth internal electrodes 123 and 124 may be exposed through the third and fourth surfaces 3 and 4 of the capacitor body 110, respectively.

The end portions of the third and fourth internal electrodes 123 and 124 alternately exposed through the third and fourth surfaces 3 and 4 of the capacitor body 110, respectively, may be electrically connected to the first and second external electrodes 131 and 132 disposed on the third and fourth surfaces 3 and 4 of the capacitor body 110 to be described below, respectively.

Referring to FIG. 3A, the third internal electrode 123 may have at least one first cutaway portion 123*a* formed in a portion connected to the first external electrode 131, that is, a portion exposed through the third surface 3 of the capacitor body 110.

A plurality of first cutaway portions 123*a* may be formed at predetermined intervals in the Y direction.

Further, respective first cutaway portions 123*a* may be filled with a part 111*a* of the uppermost or lowermost dielectric layer 111 of the active region, or a portion of a dielectric included in the upper cover 112 or the lower cover 113.

Here, the first cutaway portion 123*a* may have a semicircular shape, but the shape of the first cutaway portion 123*a* is not limited thereto.

In a case where the first cutaway portion 123*a* has a semicircular shape, capacitance loss due to the cutaway portion may be minimized.

Further, the third internal electrode 123 may further have at least first hole 123*b* formed in a portion adjacent to the first cutaway portion 123*a* in the X direction.

A plurality of first holes 123*b* may be formed at predetermined intervals in the Y direction. In this case, respective first holes 123*b* may be formed at a position that is offset with respect to the first cutaway portion 123*a* in the Y direction.

Further, respective first holes 123*b* may be filled with a part 111*b* of the uppermost or lowermost dielectric layer 111 of the active region, or a portion of the dielectric included in the upper cover 112 or the lower cover 113.

Here, the first hole 123*b* may have a circular shape, but the shape of the first hole 123*b* is not limited thereto.

However, in a case where the first hole 123*b* has an angular shape, a possibility that a breakdown voltage (BDV) decreases at a corresponding vertex may be increased. Therefore, the first hole 123*b* may have a circular shape.

Further, a total area of the plurality of first cutaway portions 123*a* and the plurality of first hole 123*b* may be 50% or less of an area (B×C) of a portion corresponding to D in FIG. 4.

In FIG. 3A, B is the length of the third internal electrode 123 in the Y direction. A crack occurring between the active region and the cover mainly occurs at upper and lower portions of a cut surface. Therefore, C may be 1/10 or less of the length (A) of the third internal electrode 123 in the X direction, and may correspond to an interval between the third surface 3 of the capacitor body 110 and the end portion of the fourth internal electrode 124.

In a case where the total area of the first cutaway portions 123*a* and the first holes 123*b* exceeds 50% of the area (B×C), a possibility that the electrodes are not connected in a process in which the electrodes are contracted after sintering is increased, and the electrodes may be ununiformly contracted. As a result, the crack may occur more easily.

Referring to FIG. 3B, the fourth internal electrode 124 may have at least one second cutaway portion 124*a* formed in a portion connected to the second external electrode 132, that is, a portion exposed through the fourth surface 4 of the capacitor body 110.

A plurality of second cutaway portions 124*a* may be formed at predetermined intervals in the Y direction.

Further, respective second cutaway portions 124*a* may be filled with the part 111*a* of the uppermost or lowermost dielectric layer 111 of the active region, or a portion of the dielectric included in the upper cover 112 or the lower cover 113.

Here, the second cutaway portion 124*a* may have a semicircular shape, but the shape of the second cutaway portion 124*a* is not limited thereto.

In a case where the second cutaway portion 124*a* has a semicircular shape, capacitance loss due to the cutaway portion may be minimized.

Further, the fourth internal electrode 124 may further have at least one second hole 124*b* formed in a portion adjacent to the second cutaway portion 124*a* in the X direction.

A plurality of second holes 124*b* may be formed at predetermined intervals in the Y direction. In this case, respective second holes 124*b* may be formed at a position that is offset with respect to the second cutaway portion 124*a* in the Y direction.

Further, respective second holes 124*b* may be filled with the part 111*b* of the uppermost or lowermost dielectric layer 111 of the active region, or a portion of the dielectric included in the upper cover 112 or the lower cover 113.

Here, the second hole 124*b* may have a circular shape, but the shape of the second hole 124*b* is not limited thereto.

However, in a case where the second hole 124*b* has an angular shape, a possibility that a breakdown voltage (BDV) decreases at a corresponding vertex may be increased. Therefore, the second hole 124*b* may have a circular shape.

Further, a total area of the plurality of second cutaway portions 124*a* and the plurality of second hole 124*b* may be 50% or less of an area (B'×C') of a portion corresponding to E in FIG. 4.

In FIG. 3B, B' is the length of the fourth internal electrode 124 in the Y direction, and C' may be 1/10 or less of the length (A) of the fourth internal electrode 124 in the X direction, and may correspond to an interval between the fourth surface 4 of the capacitor body 110 and the end portion of the third internal electrode 123.

In a case where the total area of the second cutaway portions 124*a* and the second holes 124*b* exceeds 50% of the area (B'×C'), a possibility that the electrodes are not connected in a process in which the electrodes are contracted after sintering is increased, and the electrodes may be ununiformly contracted. As a result, the crack may occur more easily.

According to the present exemplary embodiment, coupling between dielectric sheets of the active region and cover sheets of the covers 112 and 113 may be bonded to each other through the first and second cutaway portions 123*a* and 124*a*, and the first and second holes 123*b* and 124*b* to improve the bonding strength at interfaces between the covers 112 and 113 and the active region, such that the crack that may occur during sintering may be prevented.

With the above-described configuration, when predetermined voltages are applied to the first and second external electrodes 131 and 132, electric charges may be accumulated between the first and second internal electrodes 121 and 122 and between the third and fourth internal electrodes 123 and 124.

In this case, a capacitance of the multilayer ceramic capacitor 100 may be in proportion to the sum of an area of a region where the first and second internal electrodes 121 and 122 overlap each other in the Z direction in the active region of the capacitor body 110, and an area of a region where the third and fourth internal electrodes 123 and 124 overlap each other.

In addition, a material used to form the first to fourth internal electrodes 121 to 124 is not particularly limited, but may be, for example, a conductive paste formed of at least one of a noble metal material such as platinum (Pt), palladium (Pd), or a palladium-silver (Pd—Ag) alloy, nickel (Ni), or copper (Cu).

In this case, a method of printing the conductive paste may be a screen printing method, a gravure printing method, or the like, but is not limited thereto.

Voltages having different polarities may be provided to the first and second external electrodes 131 and 132, respectively, and the first and second external electrodes 131 and 132 may be disposed on the opposite end portions of the capacitor body 110 in the X direction, respectively, may be electrically connected to the exposed portions of the first and second internal electrodes 121 and 122, respectively, and may be electrically connected to the exposed portions of the third and fourth internal electrodes 123 and 124, respectively.

Here, the first and second external electrodes 131 and 132 may each include a conductive layer formed on the capacitor body 110, and a plating layer formed on the conductive layer.

The plating layer may include a nickel (Ni) plating layer formed on the conductive layer, and a tin (Sn) plating layer formed on the nickel (Ni) plating layer.

The first external electrode 131 may include a first connected portion 131a and a first band portion 131b.

The first connected portion 131a may be formed on the third surface 3 of the capacitor body 110 and be connected to the exposed portions of the first internal electrodes 121 and the exposed portions of the third internal electrodes 123, and the first band portion 131b may extend from the first connected portion 131a to a portion of the first surface 1 of the capacitor body 110.

In this case, the first band portion 131b may further extend to a portion of the second surface 2 of the capacitor body 110 and portions of the fifth and sixth surfaces 5 and 6 of the capacitor body 110, if necessary, in order to improve adhesion strength or the like.

The second external electrode 132 may include a second connected portion 132a and a second band portion 132b.

The second connected portion 132a may be formed on the fourth surface 4 of the capacitor body 110 and be connected to the exposed portions of the second internal electrodes 122 and the exposed portions of the fourth internal electrodes 124, and the second band portion 132b may extend from the second connected portion 132a to a portion of the first surface 1 of the capacitor body 110.

In this case, the second band portion 132b may further extend to a portion of the second surface 2 of the capacitor body 110 and portions of the fifth and sixth surfaces 5 and 6 of the capacitor body 110, if necessary, in order to improve adhesion strength or the like.

In general, a multilayer ceramic capacitor is formed by stacking a plurality of dielectric layers and internal electrodes, a crack, which is one of major defects, occurs between an active region including the internal electrodes and a cover that does not include the internal electrodes.

The related art discloses a structure in which the internal electrode includes a resin at a higher content to increase the strength of the internal electrode, thereby increasing the bonding strength between the internal electrode and the cover in order to prevent such a crack.

As another method, the related art discloses a method of adjusting the content of an organic material to reduce a mismatch of burning-out/sintering of the cover and the active region.

However, such methods have a limitation in preventing the crack occurring between the active region and the cover.

In general, the uppermost internal electrodes and lowermost internal electrodes in the capacitor body of the multilayer ceramic capacitor are in contact with the upper cover and the lower cover, respectively.

The cover and the internal electrode are damaged due to stress in a process of cutting the laminate. At this time, the active region and the cover slightly delaminate from each other or the bonding strength between the active region and the cover is decreased. The delamination becomes severe or the decrease in bonding strength becomes more significant during sintering. As result, the crack occurs between the active region and the cover.

The sheet is deformed or torn in a process in which a solvent used in the internal electrode is adsorbed in a binder of the sheet and dried, which is called sheer attack.

In the internal electrode, Ni and a common material are disposed in a nearly nonpolar solvent in order to prevent the sheer attack, and a low-polarity binder is used as the binder. In addition, the internal electrode includes the binder at a low content which corresponds to ⅓ or ½ of that in the dielectric sheet or cover sheet.

On the other hand, basically, a high polymer binder with extremely high polarity is applied to the dielectric sheet of the active region or the cover sheet of the cover, and the content of the high polymer binder is very high.

For this reason, the bonding strength at an interface between the cover sheet of the cover and the internal electrode is much weaker than the bonding strength between the cover sheet of the cover and the dielectric sheet of the active region, and therefore, the cover and the internal electrode are easily separated from each other.

Accordingly, in a case where the cover and the active region are firmly bonded to each other in a green chip state, and do not delaminate from each other or are damaged due to cutting stress, the crack occurring between the active region and the cover may be suppressed.

According to the present exemplary embodiment, based on the idea that the bonding strength between the cover sheet of the cover and the dielectric layer of the active region is stronger than the bonding strength between the internal electrode and the cover, the cutaway portions and the holes are formed in the third and fourth internal electrodes by patterning portions of the third and fourth electrodes that are in contact with cut surfaces and portions of the third and fourth electrodes that are adjacent to the cut surfaces, the third and fourth internal electrodes being positioned at the uppermost and lowermost ends of the active region.

Therefore, as the cover sheet of the cover is stretched through cutaway portions and holes of corresponding third and fourth internal electrodes when the laminate is compressed, the cover sheet of the cover and the dielectric sheet of the active region are naturally bonded to each other, and the bonding strength therebetween is increased.

As described above, when the cover sheet of the cover and the dielectric sheet of the active region come into contact with each other and are bonded to each other, the bonding strength at the interface between the cover and the active region is increased. In addition, since the internal electrode positioned between the cover sheet and the dielectric sheet is also held tight, the bonding strength is further increased.

With such an effect, according to an exemplary embodiment in the present disclosure, the crack between the active region and the cover, which is one of chronic defects of the multilayer ceramic capacitor, may be effectively prevented.

Figure 6:
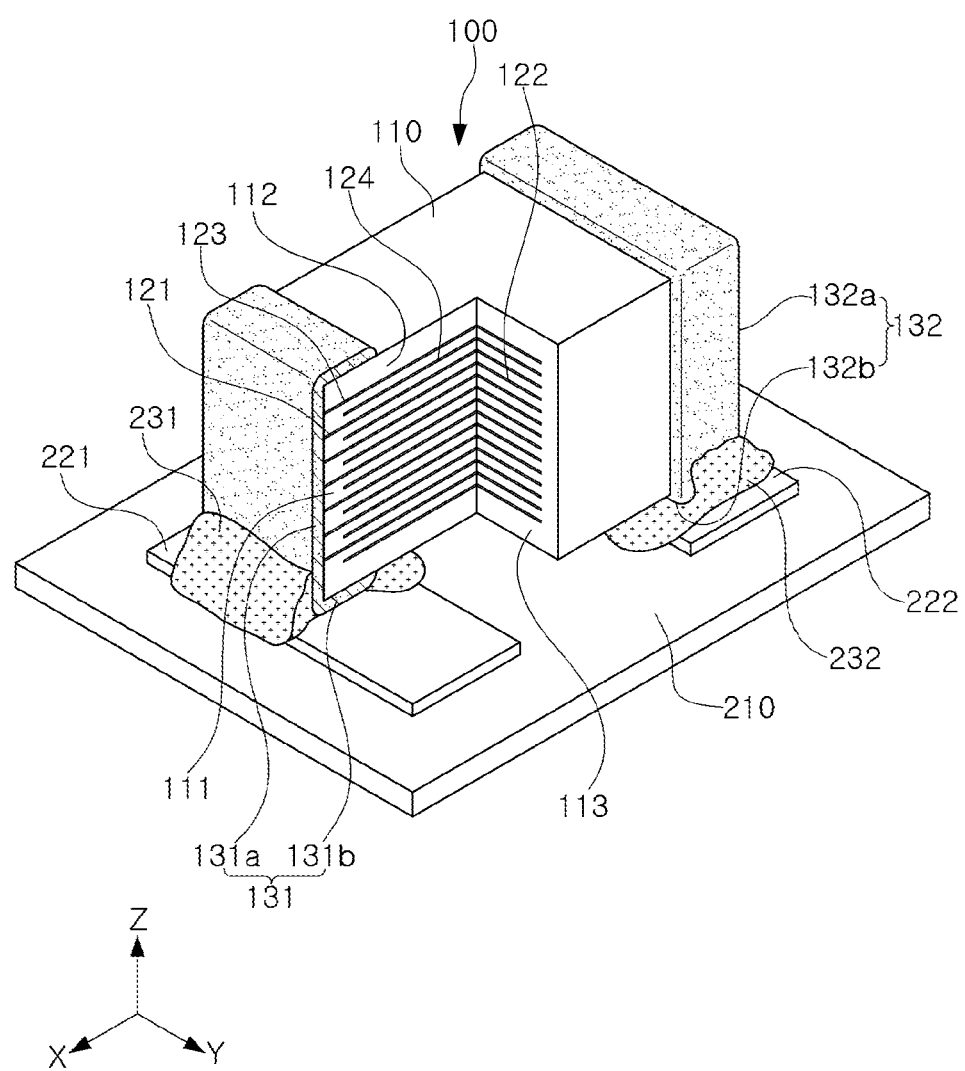
FIG. 6 is a perspective view schematically illustrating a structure in which the multilayer ceramic capacitor according to an exemplary embodiment in the present disclosure is mounted on a board.

FIG. 6 is a perspective view schematically illustrating a structure in which the multilayer ceramic capacitor according to an exemplary embodiment in the present disclosure is mounted on a board.

Referring to FIG. 6, a board having a multilayer ceramic capacitor according to the present exemplary embodiment may include a board 210 on which the multilayer ceramic capacitor 100 is mounted, and first and second electrode pads 221 and 222 disposed on an upper surface of the board 210 so as to be spaced apart from each other.

The multilayer ceramic capacitor 100 is mounted on the board 210 so that the first and second external electrodes 131 and 132 are positioned on the first and second electrode pads 221 and 222 so as to be in contact with the first and second electrode pads 221 and 222, respectively.

In this case, the first external electrode 131 may be coupled to the first electrode pad 221 by a solder 231 and electrically and physically connected to the first electrode pad 221, and the second external electrode 132 may be coupled to the second electrode pad 222 by a solder 232 and electrically and physically connected to the second electrode pad 222.

Here, the multilayer ceramic capacitor 100 may be the multilayer ceramic capacitor according to an exemplary embodiment in the present disclosure described above. Therefore, a detailed description of the multilayer ceramic capacitor 100 will be omitted in order to avoid an overlapping description.

As set forth above, according to the exemplary embodiment in the present disclosure, the bonding strength between the internal electrode and the cover at the interface between the active region and the cover may be increased to decrease occurrence of a crack between the active region and the cover.

While exemplary embodiments have been shown and described above, it will be apparent to those skilled in the art that modifications and variations could be made without departing from the scope of the present disclosure as defined by the appended claims.

What is claimed is:

1. A multilayer ceramic capacitor comprising:
a capacitor body including:
an active region including a plurality of dielectric layers and a plurality of internal electrodes alternately disposed with respective dielectric layers interposed therebetween, and
covers disposed on and under the active region, respectively; and
external electrodes disposed on the capacitor body so as to be connected to the internal electrodes,
wherein among the internal electrodes, an internal electrode disposed adjacently to one of the covers has a cutaway portion within a portion of the internal electrode connected to the external electrode and the cutaway portion is filled with a dielectric material, and
wherein the internal electrode disposed adjacently to the one of the covers further has a hole, filled with a dielectric material, within a portion adjacent to the cutaway portion of the internal electrode.

2. The multilayer ceramic capacitor of claim 1, wherein the cutaway portion is formed in two internal electrodes disposed adjacently to the covers, respectively.

3. The multilayer ceramic capacitor of claim 1, wherein the cutaway portion is filled with a portion of one of the plurality of dielectric layers.

4. The multilayer ceramic capacitor of claim 1, wherein the cutaway portion has a semicircular shape.

5. The multilayer ceramic capacitor of claim 1, wherein the hole has a circular shape.

6. The multilayer ceramic capacitor of claim 1, wherein a total area of the cutaway portion and the hole is 50% or less of B×C, in which B is a width of the internal electrode disposed adjacently to the one of the covers and C is 1/10 or less of a length of the internal electrode.

7. The multilayer ceramic capacitor of claim 6, wherein the cutaway portion is filled with a portion of one of the plurality of dielectric layers.

8. The multilayer ceramic capacitor of claim 7, wherein the cutaway portion has a semicircular shape.

9. The multilayer ceramic capacitor of claim 7, wherein the hole has a circular shape.

10. The multilayer ceramic capacitor of claim 1, wherein the external electrode includes a connected portion disposed at one end surface of the capacitor body, and a band portion extending from the connected portion to a portion of a circumferential surface of the capacitor body.

11. A board having a multilayer ceramic capacitor, comprising:
a board having one surface on which a plurality of electrode pads are disposed; and
the multilayer ceramic capacitor of claim 1 mounted so that the external electrodes are connected to the electrode pads, respectively.

12. The board of claim 11, wherein the cutaway portion is filled with a portion of one of the plurality of dielectric layers.

13. A multilayer ceramic capacitor comprising:
a capacitor body including a plurality of dielectric layers and a plurality of internal electrodes disposed with respective dielectric layers interposed therebetween, and a cover disposed on or under a first internal electrode of the plurality of internal electrodes such that the cover is adjacent to the first internal electrode,
wherein the first internal electrode includes a cutaway portion within a part of the first internal electrode that is to be connected to an external electrode and the cutaway portion is at least partially filled with a dielectric material, and
wherein the cutaway portion is filled with the dielectric material of one of the plurality of dielectric layers.

14. The multilayer ceramic capacitor of claim 13, wherein the cutaway portion has a semicircular shape.

15. The multilayer ceramic capacitor of claim 13, wherein the first internal electrode has a hole adjacent to the cutaway portion of the first internal electrode.

16. The multilayer ceramic capacitor of claim 15, wherein the hole has a circular shape.

17. The multilayer ceramic capacitor of claim 15, wherein a total area of the cutaway portion and the hole is 50% or less of B×C, in which B is a width of the first internal electrode and C is 1/10 or less of a length of the first internal electrode.

18. The multilayer ceramic capacitor of claim 13, further comprising the external electrode disposed on the capacitor body so as to be connected to one or more of the plurality of internal electrodes.

\* \* \* \* \*